US007156372B2

United States Patent

Kelsey et al.

(10) Patent No.: US 7,156,372 B2
(45) Date of Patent: Jan. 2, 2007

(54) NON-CONTACT VALVE FOR PARTICULATE MATERIAL

(75) Inventors: Jeffery P. Kelsey, Geneva, NY (US); Thomas M. Bragg, Auburn, NY (US)

(73) Assignee: Eastman Kodak Company, Rochester, NY (US)

( * ) Notice: Subject to any disclaimer, the term of this patent is extended or adjusted under 35 U.S.C. 154(b) by 106 days.

(21) Appl. No.: 11/011,820

(22) Filed: Dec. 14, 2004

(65) Prior Publication Data

US 2005/0133536 A1 Jun. 23, 2005

Related U.S. Application Data

(60) Provisional application No. 60/531,000, filed on Dec. 19, 2003.

(51) Int. Cl.
*F16K 1/42* (2006.01)

(52) U.S. Cl. ........................ 251/359; 141/70; 406/128

(58) Field of Classification Search ................ 251/359; 141/69, 70; 406/127, 138
See application file for complete search history.

(56) References Cited

U.S. PATENT DOCUMENTS

| | | | | |
|---|---|---|---|---|
| 5,727,607 | A * | 3/1998 | Ichikawa et al. | 141/67 |
| 6,311,745 | B1 * | 11/2001 | Welch et al. | 141/346 |
| 6,467,943 | B1 * | 10/2002 | Maguire | 366/141 |
| 6,609,871 | B1 * | 8/2003 | Pfeiffer et al. | 414/328 |

* cited by examiner

*Primary Examiner*—Edward K. Look
*Assistant Examiner*—John K. Fristoe, Jr.
(74) *Attorney, Agent, or Firm*—Lawrence P. Kessler

(57) ABSTRACT

A non-contact valve (24, 26) for controlling the flow of particulate material (M) includes a body (102) and a gas-porous element (106) associated with the body (102). A first orifice (122) is defined by the gas-porous element (106). The gas-porous element (106) directs a flow of pressurized gas into the first orifice (122). A plug member (104) receivable within the first orifice (122) is movable into and out of the first orifice (122). A channel (C) is conjunctively defined at least in part by the first orifice (122) and the plug (104). The channel (C) defines a flow path (124) for the particulate material (M). The length of the channel (C) is adjusted to thereby adjust the velocity of gas flowing through the channel (C) and, thereby, adjust the flow of material (M) therethrough.

11 Claims, 3 Drawing Sheets

NON-CONTACT VALVE FOR PARTICULATE MATERIAL

CROSS REFERENCE TO RELATED APPLICATION

Reference is made to and priority claimed from U.S. Provisional Application Ser. No. 60/531,000, filed Dec. 19, 2003, entitled NON-CONTACT VALVE FOR PARTICULATE MATERIAL.

FIELD OF THE INVENTION

The present invention relates to a valve for use with fine particulate materials, such as toner for electrophotographic printing.

BACKGROUND OF THE INVENTION

The toner used in electrophotographic printing machines is a blend of materials or ingredients, including plastic resins, coloring pigments, magnetic iron oxides, waxes, charge control agents, and other ingredients. Most toners are produced in bulk using a melt mixing or hot compounding process. The materials are typically fed by continuous loss-in-weight auger-type feeders into an extruder where they are blended together while in a molten state to thereby form a hot paste having a consistency similar to cake mix. This mixture is then cooled, typically by forming it into slabs on a cooling belt or by pelletizing the mixture in water. The pellets are then ground or pulverized into a toner powder by jet mills or air-swept hammer mills. This process produces a powder having a range of particle sizes. The toner powder is sieved or sifted to remove over-size and under-size toner particles, and may be blended with additives to adjust flow and electrostatic charging properties. The finished bulk toner is then packaged into end-use containers, such as toner bottles or cartridges, which are suitable for sale to and/or use by end users.

As discussed above, auger-type continuous loss-in-weight feeders are used to deliver the ingredients to the extruder. The auger-type feeders are often clustered together, and the multiple ingredients are fed into the extruder through a single extruder inlet. In such cases, side feeders/screw conveyors are often required since the relatively short auger-type feeders must be arranged in small feeder clusters, typically of two to four devices. The auger-type feeders typically require vibrators or agitators to promote the movement of the ingredients to the feeding auger. It can be difficult to achieve a consistent flow rate of such fine powdered ingredients through an auger-type feeder. Such powders may become fluidized, and flushing (uncontrolled flowing) of the fluidized powder through the feeder can occur. Therefore, the auger-type feeders generally require complicated control programs that are designed to adapt to the varying densities and flow characteristics of the powders as they move through the feeders.

After the toner powder is produced, it must be packaged. Packaging the toner or other powdered material into end-use containers generally involves the movement of the bulk toner from a filling hopper through a filling tube. The filling tube empties into toner bottles that have been conveyed into a toner bottle filling station. The toner is a fine powder that can have widely-varying bulk density and flow characteristics that may range from a dense cohesive powder to a low-density highly-fluid material. Conventional toner feeders/fillers typically involve moving the toner from one vessel to another by the force of gravity through vertically-oriented conduits that include an auger or a screw-feed system. Such auger-assisted, force-of-gravity systems are typically used to move the toner from the filler hopper through the filler tube and into the toner bottles. Since the toner tends to de-aerate or settle as it resides in a vessel or hopper, it can be difficult to obtain consistent gravimetric feed rates with auger-type feeders or fillers, which operate on a volumetric principle. On the other hand, highly-fluid toners may flush through an auger-type device and an uncontrolled flow or feed rate can result.

In short, the toner production process generally, and the bottle filling process in particular, has required that toner be fed from one vessel to the next utilizing either horizontal augers or auger-assisted force-of-gravity systems. Thus, for example, the bottle-filling hopper must typically be disposed above the bottle-filling station so that the force of gravity assisted by the auger moves the toner through the hopper, into and downward through the filler tube, and into the toner bottle. The need to feed toner from one vessel to the next by horizontal augers or by the force of gravity assisted by augers places substantial constraints on the process flow used to produce toner.

Further, the use of augers in the production of toner can have certain undesirable consequences. The augers must be precisely aligned, i.e., centered, relative to the funnel-shaped hopper outlet and extend through the outlet and into the filling tube and/or into the toner bottle. Even slight misalignment of the auger relative to the hopper outlet, filling tube, and/or toner bottle may bend the auger, causing the auger to seize. Augers may also bend during operation, installation, and during preventative maintenance. A bent or misaligned auger may rub against the funnel-shaped outlet, against the filler tube or against the toner bottle, causing toner to agglomerate or fuse on the auger. The agglomerated or fused toner may be dislodged and flake off from the auger into, and thereby contaminating, the packaged toner product. Bent or misaligned augers also require that the hopper and filling tube be emptied and cleaned. Seals used to seal the shafts of the augers become worn and fibers or lubricant from the worn seals may drop into and contaminate the finished toner product. Further, toner powder may penetrate through a worn seal, harden around the shaft, and then flake off into and contaminate the finished toner product, or may cause mechanical failure of bearings or other mechanical devices not intended to be exposed to toner.

The rotational speed or number of revolutions of an auger is often used as an indirect measure of the weight of toner dispensed into a toner bottle. However, toner powder de-aerates as it settles. On start up of the auger, toner particles in the hopper will be more densely packed and, therefore, more particles are carried by the auger. As the process continues and reaches a steady state, the toner particles are less densely packed and therefore fewer particles are carried by each revolution of the auger. Thus, the rotational speed or number of revolutions of the auger must be adjusted accordingly.

Therefore, what is needed in the art is a method and apparatus for controlling the flow and/or movement of bulk toner.

SUMMARY OF THE INVENTION

The present invention provides a variable-orifice non-contact valve for controlling the flow and/or movement of bulk particulate materials such as toner.

The invention provides, in one form thereof, a variable-orifice non-contact valve having a body and a gas-porous element associated with the body. A first orifice is defined by the gas-porous element. The gas-porous element directs a flow of pressurized gas into the first orifice. A plug member receivable within the first orifice is movable into and out of the orifice. A channel is conjunctively defined at least in part by the first orifice and the plug. The channel defines a flow path for the particulate material. The length of the channel is adjusted to, thereby, adjusting the velocity of gas flowing through the channel and, thereby, adjust the flow of material therethrough.

An advantage of the present invention is that the flow and/or movement of the particulate material is controlled with a reduced likelihood of flaking, compaction and fusion.

A further advantage of the present invention is that the need for preventative maintenance is reduced.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate preferred embodiments of the invention, in one form, and such exemplifications are not to be construed as limiting the scope of the invention in any manner.

DETAILED DESCRIPTION OF THE DRAWINGS

Figure 1:
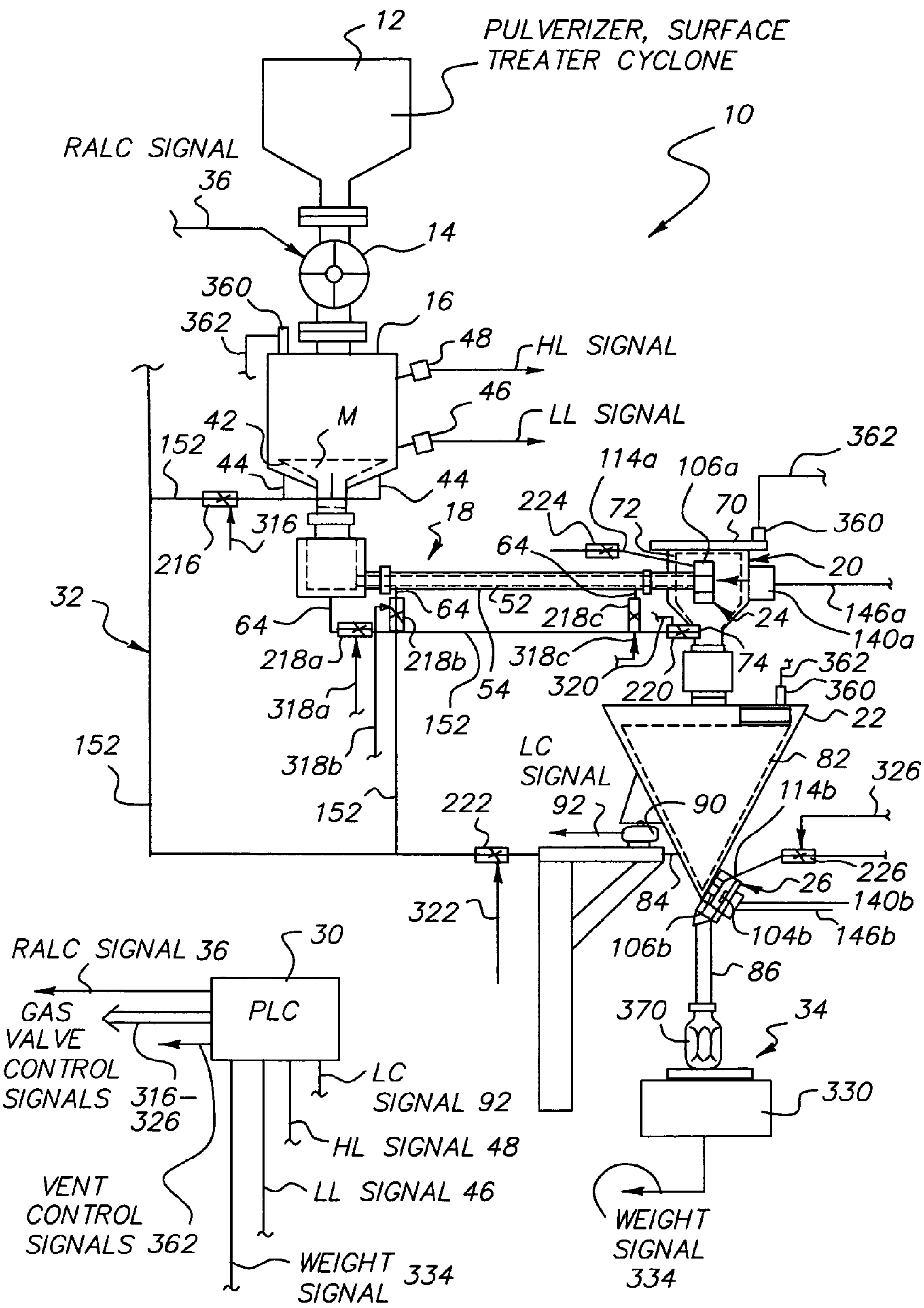
FIG. 1 is a diagrammatic view of one embodiment of a toner bottle filling apparatus of the present invention.

Referring now to FIG. 1, one embodiment of a toner bottle filling apparatus of the present invention is shown. Apparatus 10 includes a pulverizer or classifier receiver 12, rotary air lock valve 14, reservoir hopper 16, transition and pipe assembly 18, feeder hopper 20, discharge hopper 22, non-contact valves 24 and 26, programmable logic controller (PLC) 30, gas supply and control system 32, and fill station 34.

For convenience, apparatus 10 is discussed hereinafter in connection with toner for electrophotographic printing. However, it is to be understood that apparatus 10 is suitable for use with most fine powder materials, such as, for example, toner, carbon, silica, alumina, titanium dioxide, talc, plastic resins, pigments and other powdered materials that are classified in groups A, B, and/or C of a Geldart Chart. Generally, apparatus 10 moves or conveys bulk toner or other fine powder through at least a portion of the production process and into containers, such as, for example, end-use toner bottles or other containers, and controls such movement without the need for augers and/or vibratory feeders.

Pulverizer or classifier receiver 12 (hereinafter referred to only as pulverizer 12) is a conventional pulverizer that reduces toner particles or particles of other powdered material M from a relatively large size to a smaller desired size or range of sizes. Pulverizer 12 is connected to reservoir hopper 16 via rotary air lock valve 14, through which material M passes out of pulverizer 12 and into reservoir hopper 16.

Rotary air lock valve 14 is a conventional rotary air lock that controls the flow of material M from pulverizer 12 and into reservoir hopper 16.

Rotary air lock valve 14 is connected to PLC 30, which issues rotary air lock control (RALC) signal 36 to rotary air lock valve 14. RALC signal 36 determines, at least in part, the rate of rotation of rotary air lock valve 14 and thereby the rate of flow of material M into reservoir hopper 16.

Reservoir hopper 16 includes a liner 42 and gas inlets 44. Liner 42 is a gas-permeable liner that lines or covers at least a portion of the inner funnel-shaped wall of reservoir hopper 16. Liner 42 is therefore disposed between the covered portion of the inner walls of reservoir hopper 16 and material M contained therein. Gas inlets 44 are connected to gas supply and control system 32, which is more particularly described hereinafter. Gas supply and control system 32 via gas inlets 44 supplies a pressurized gas, such as, for example, air, nitrogen, or other inert gas, to the space between the inner walls of reservoir hopper 16 and liner 42. The gas permeates through liner 42 to fluidize the material M within at least the lined portion of reservoir hopper 16 to fluidize and thereby enhance the flow of material M through and out the funnel-shaped outlet of reservoir hopper 16. Reservoir hopper 16 further includes low and high-level sensors 46 and 48, respectively, to sense the level of material M therein. Low and high-level sensors 46, 48, respectively, issue low and high-level signals LL signal and HL signal, respectively, to PLC 30. An outlet (not referenced) of reservoir 16 is connected to transition and pipe assembly 18, and material M passes from reservoir 16 through the outlet thereof and into transition and pipe assembly 18.

Transition and pipe assembly 18 is, in general, an elongate, fluidizing conduit that interconnects reservoir 16 with feeder hopper 20. One embodiment of a transition and pipe assembly 18 is fully described and completely disclosed in U.S. Pat. No. 6,609,871, entitled SYSTEM FOR HANDLING BULK PARTICULATE MATERIALS, the disclosure of which is incorporated herein by reference. Therefore, the details of the construction and operation of transition and pipe assembly 18 are not reproduced at length herein.

In general, however, transition and pipe assembly 18 includes an inner gas-permeable conduit 52 surrounded by an outer gas-impervious conduit 54. Transition and pipe assembly 18 further includes a plurality of gas inlets 64 along the length thereof, which are connected to gas supply and control system 32. Inlets 64 connect a plurality of chambers (not shown) defined between inner gas-permeable conduit 52 and outer gas-impervious conduit 54 with gas supply and control system 32. The gas permeates through inner gas-permeable conduit 52 to fluidize the material M within transition and pipe assembly 18 and thereby enhance the flow of material M through and out the funnel-shaped outlet of reservoir hopper 16. The pressure of gas supplied to each of the chambers in transition and pipe assembly 18 is controlled and can be varied and/or modulated along the length of transition and pipe assembly 18 to control the flow of material M therein. The outlet end (not referenced) of transition and pipe assembly 18 is connected via variable-orifice non-contact valve 24 to feeder hopper 20, and material M flows from transition and pipe assembly 18 through variable-orifice non-contact valve 24 and into feeder hopper 20.

Feeder hopper 20 includes sidewalls (not referenced), a top 70, and a gas-permeable liner 72. The sidewalls and top

70 of feeder hopper 20 are impervious to gas. Gas-permeable liner 72 is shaped generally like an inverted bag, and lines the sidewalls and top 70 of feeder hopper 20. Feeder hopper 20 receives material M from transition and pipe assembly 18 via variable-orifice non-contact valve 24, which is coupled to the outlet of transition and pipe assembly 18. The flow-controlling parts or components of non-contact valve 24 are disposed within and sealingly surrounded by gas-permeable liner 72, which also sealingly engages and surrounds the outlet end of transition and pipe assembly 18. Thus, the flow of material M from transition and pipe assembly 18 and out non-contact valve 24 is sealed within gas-permeable liner 72. Feeder hopper 20 includes gas inlet 74, which is supplied via gas supply and control system 32 with pressurized gas that fills the space between gas-permeable liner 72 and gas-impervious top 70 and sidewalls of feeder hopper 20. The gas permeates through gas-permeable liner 72 to fluidize the material M therein and to thereby enhance the flow of material M through and out the funnel-shaped outlet of feeder hopper 20 and into discharge hopper 22.

Discharge hopper 22 is a funnel-shaped hopper having a sidewall and a top that are impervious to gas, is lined with gas-permeable liner 82, and includes one or more gas inlets 84. Gas-permeable liner 82 lines the inside of discharge hopper 22. Discharge hopper 22 receives material M from feeder hopper 20 and dispenses material M to filling tube 86 via second non-contact valve 26. More particularly, material M flows from feeder hopper 20 into gas-permeable liner 82 of discharge hopper 22. Gas inlets 84 are supplied via gas supply and control system 32 with pressurized gas that fills the space between gas-permeable liner 82 and the gas-impervious walls and top of discharge hopper 22. The gas permeates through gas-permeable liner 82 to fluidize the material M therein. Second non-contact valve 26, which is described more particularly hereinafter, controls the flow of material M from within gas-permeable liner 82 and into filling tube 86. Material M flows through filling tube 86 and into a toner bottle 370 or other container disposed in an otherwise conventional bottle filling station 34.

One or more load cells 90 (only one shown) are operably associated with discharge hopper 22 to measure the weight of material M contained within discharge hopper 22. Load cells 90 are electrically connected to PLC 30, and issue thereto load cell signal (LC signal) 92 that is indicative of the weight and thus the amount of material M within discharge hopper 22.

Non-contact valves 24 and 26 are substantially similar in structure, and therefore a detailed discussion of non-contact valve 26 follows hereafter. It is to be understood that the following detailed discussion of non-contact valve 26 is also generally applicable to variable-orifice non-contact valve 24, and that any significant exceptions thereto are particularly discussed hereinafter.

Figure 3:
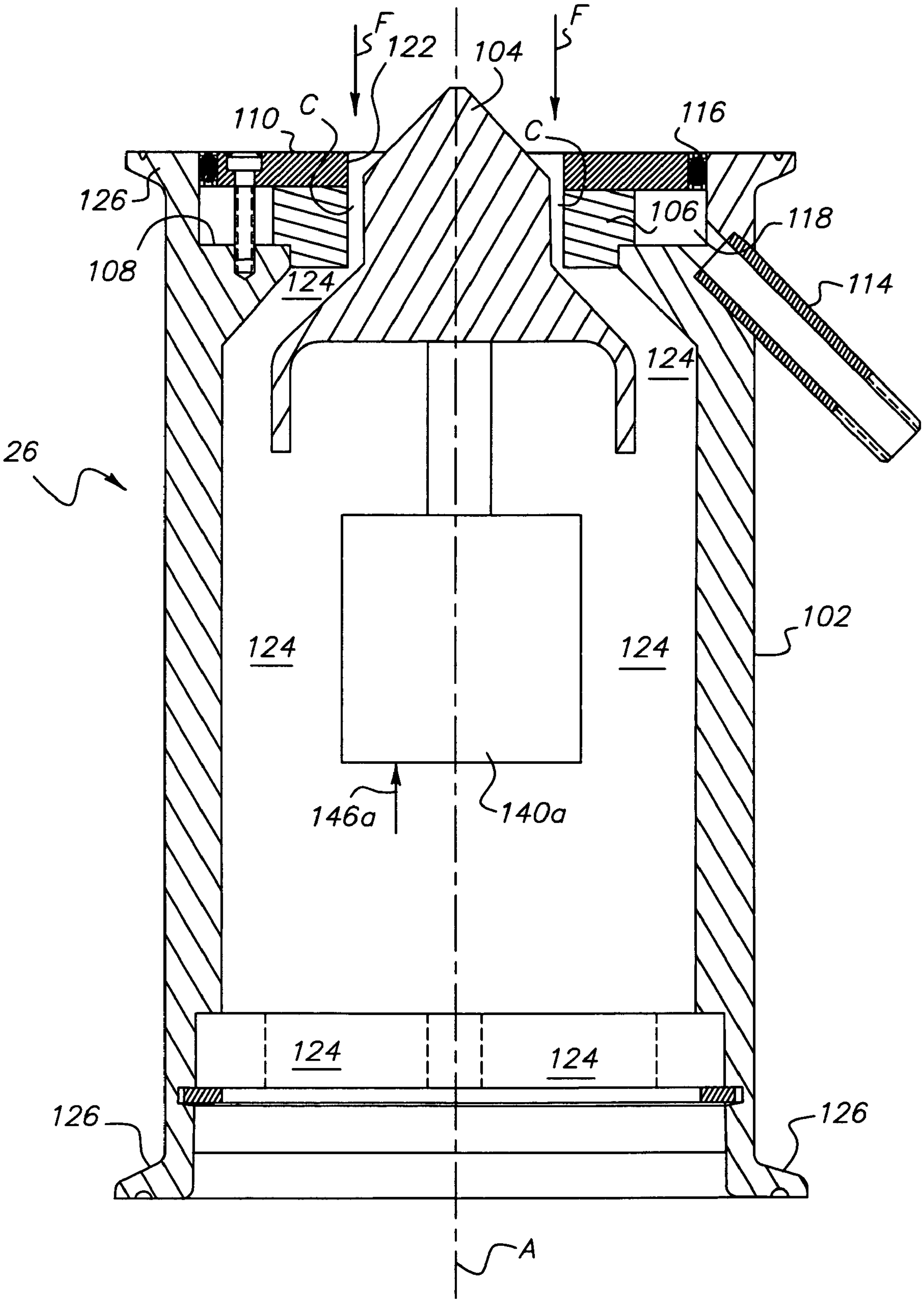
FIG. 3 is cross-sectional view of one embodiment of the non-contact valve of FIGS. 1 and 2.

As best shown in FIG. 3, non-contact valve 26 includes outer body 102, plug 104, and gas-porous ring 106. Generally, non-contact valve 26 adjusts the position of plug 104 relative to gas-porous ring 106 thereby adjusting the length of the flow path and/or size of the orifice through which material M flows. A curtain of high-velocity air/gas is thus created that controls the amount of material M flowing through non-contact valve 26. Valves 24 and 26 are in general, and plug 104, ring 106 and/or inlet orifice 122 in particular, configured to direct the flow of pressurized air or gas in a direction that opposes the flow of material M. Because non-contact valves 24 and 26 control the flow of material M by a "curtain of air" effect rather than by two surfaces that come into engagement and/or direct contact, the occurrence of clumping and flaking of material M is reduced.

Body 102 is a hollow cylindrical or tubular member having a central axis A and including an integral flange 108, front plate member 110, gas inlet 114 and sealing member 116. Flange 108 is formed around the inner periphery of body 102 proximate the inlet end of non-contact valve 26. Gas-porous ring 106 is seated upon flange 108. Plate member 110 is affixed, such as, for example, by bolts, screws or other fasteners, to body 102 and/or flange 108, to thereby capture gas-porous ring 106 between plate member 110 and flange 108. Sealing member 116 seals the interface of front plate member 110 and body 102. An annular chamber 118 is thus defined between flange 108, the inner wall of body 102 above flange 108, gas-porous ring 106, top plate 110, and sealing member 116. Gas inlet 114 is sealingly coupled to or integral with body 102, and extends from the outside of body 102 into chamber 118. Gas inlet 114 is connected at a first/outside end thereof to gas supply and control system 32 to thereby connect chamber 118 to a source of pressurized gas.

Central orifices (not referenced) defined by plate member 110 and gas-porous ring 106 have substantially equal diameters and are substantially coaxial relative to each other and relative to central axis A, and thereby form a substantially cylindrical inlet orifice 122. Inlet orifice 122 defines in part an inlet portion of flow path 124. The inlet portion of flow path 124 further includes flow channel C, which is defined by the region or clearance between the axial-overlapping portions of plug 104 and inlet orifice 122. Flow path 124 extends axially through body 102 from inlet orifice 122, through channel C, and through body 102 to the outlet end thereof. At each end body 102 defines mounting flanges 126 to enable non-contact valve 26 to be operably coupled and/or affixed to other pieces of equipment. Body 102 is constructed of a gas-impervious material, such as, for example, stainless steel, aluminum, brass, plastic, or other suitable gas-impervious materials.

Plug 104 is generally conical or frustoconical in shape, and is tapered from narrow to wide in the direction of flow F of material M. Plug 104 is substantially concentric relative to gas-porous ring 106, and is movable in an axial direction toward and away from inlet orifice 122. Plug 104 is dimensioned such that there is a predetermined minimum clearance, such as, for example, from approximately 0.005 to approximately 0.025 inches, between inlet orifice 122 and the largest-diameter portion of plug 104 that will be disposed within inlet orifice 122. Plug 104 is constructed of a gas-impervious material, such as, for example, stainless steel, aluminum, brass, plastic, or other suitable gas-impervious materials.

Gas-porous ring 106 is a ring of sintered material, such as, for example: stainless steel, brass, aluminum, or other suitable gas-permeable material. As discussed above, gas-porous ring 106 is captured between plate member 110 and flange 108 to thereby preclude or substantially limit movement of gas-porous ring 106 in the axial direction. Gas-porous ring 106 includes a grove or notch (not referenced) on the outer-diameter of its inner face that engages the lip (not referenced) of flange 108 to thereby preclude or substantially limit movement of gas-porous ring 106 in a radial direction. The pores of the surfaces of gas-porous ring 106 that are perpendicular to the direction of flow F of material M are closed or sealed, such as, for example, by machining and/or grinding. Therefore, gas-porous ring is porous only in the radial direction, i.e. the direction perpendicular to the direction of flow F, and gas flows from chamber 118 through gas-porous ring 106 in a direction toward and into inlet orifice 122 and through channel C.

It should be noted that in referring to the component parts of non-contact valve 24 the suffix letter “a” may be used, whereas the component parts of non-contact valve 26 may be referred to and/or be labeled with the suffix letter “b”. Thus, for example, the gas-porous ring of non-contact valve 24 is referred to as and labeled with reference number 106*a*, whereas the gas-porous ring of non-contact valve 26 is referred to as and labeled with the reference number 106*b*. The suffixes are generally omitted from the description of the valves, except where clarity requires otherwise.

It should the also be noted that the body of non-contact valve 24, due to its generally horizontal orientation, is preferably constructed at least in part of a relatively wide mesh material to thereby permit material M to flow or drop into feeder hopper 20. Alternatively, the sidewalls and top of feeder hopper 20 form, at least in part, the body of non-contact valve 24.

Figure 2:
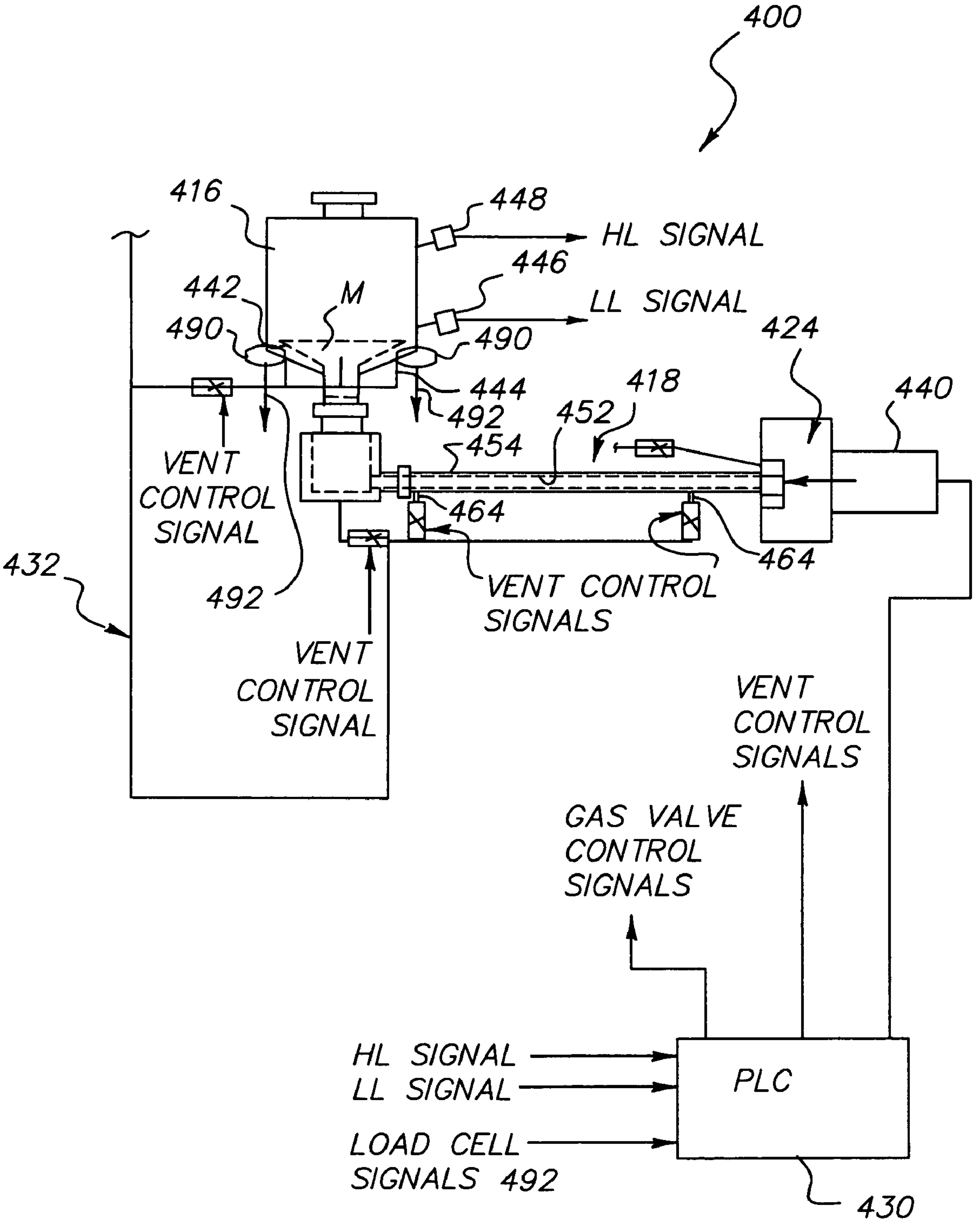
FIG. 2 is a diagrammatic view one embodiment of a toner feeding or conveying apparatus of the present invention.

Non-contact valves 24 and 26 are actuated by respective actuators 140*a*, 140*b*, such as, for example, air cylinders, linear motors, stepper motors, and/or other suitable actuators. Actuators 140*a*, 140*b* translate the corresponding plugs 104*a*, 104*b* in a direction toward and/or away from inlet orifices 122*a* and 122*b*, respectively. Actuators 140*a* and 140*b* are electrically connected to PLC 30, and receive therefrom, actuator control signals 146*a* and 146*b*, respectively, that determine at least in part the position of plugs 104*a* and 104*b* relative to inlet orifices 122*a* and 122*b*, respectively. In the embodiment shown in FIG. 1, and as is more particularly described hereinafter, actuator 140*a* is disposed external to body 102*a* and is configured as a three-position actuator whereas actuator 140*b*, which is also disposed external to body 102*b*, is configured as a two-position actuator. As shown in FIG. 2, actuator 140*a*, and thus actuator 140*b*, can be exposed within the body of the corresponding non-contact valve. In such an embodiment, the actuator must be able to withstand the application operating conditions and be appropriately sealed against penetration of material M.

Programmable logic control (PLC) 30 is a conventional programmable logic controller. PLC 30 receives LL Signal and HL signal from low and high-level sensors 46 and 48, respectively, and receives weight signal 334 from scale 330. Further, or alternatively, PLC 30 receives LC Signal 92 from scale load cell 90. PLC 30 issues RALC signal 36 to rotary valve 14, issues gas valve control signals 316–326 to gas control valves 216–226, respectively, and issues vent control signals 362 to vents 360.

Gas supply and control system 32 includes a network of interconnected conduits 152 that interconnect each of gas inlets 44, 64, 74, 84, 114*a*, and 114*b* to a supply of pressurized gas (not shown), such as, for example, air, nitrogen, or other inert gas. Generally, a plurality of gas flow control valves control the flow of pressurized gas through, and the pressure within corresponding branches of, conduit 32 thereby controlling the pressure of the gas supplied via gas inlets 44, 64, 74, 84, 114*a*, and 114*b* to the corresponding component parts of apparatus 10.

More particularly, gas flow control valve 216 controls the flow of gas through inlet 44 and into reservoir hopper 16, and supplies that gas at a predetermined pressure/flow which is sufficient to fluidize material M therein, at least in the proximity of the funnel-shaped outlet thereof. Gas flow control valves 218*a*, 218*b*, and 218*c* control the flow of gas through inlets 64 and into respective chambers (not shown) along the length of transition and pipe assembly 18, and supplies that gas at a predetermined pressure/flow which is sufficient to fluidize material M therein. The pressure of gas supplied via gas flow control valves 218*a*, 218*b*, and 218*c* is modulated, as discussed above, to control the flow of material M through transition and pipe assembly 18. Similarly, gas flow control valve 220 controls the flow of gas through inlet 74 and into feeder hopper 20, and supplies that gas at a predetermined pressure which is sufficient to fluidize material M therein. Gas flow control valve 222 controls the flow of gas through inlet 84 and into discharge hopper 22, and supplies that gas at a predetermined pressure sufficient to fluidize material M therein. Gas flow control valves 224 and 226 control the flow of gas to inlets 114*a* and 114*b*, and thereby control the flow of gas to non-contact valves 24 and 26, respectively.

Generally, the gas supplied to reservoir hopper 16, transition and pipe assembly 18, feeder hopper 20, and discharge hopper 22 by gas supply and control system 32 is supplied at a pressure sufficient to fluidize material M. For applications in which material M is toner or substantially similar to toner, the pressure is from, for example, approximately 0.5 to approximately 3.5 inches of water column. The pressure of gas supplied by gas supply and control system 32 to non-contact valves 24 and 26 for applications in which material M is toner or substantially similar to toner is from, for example, approximately 5 to approximately 10 pounds per square inch (psi). However, it is to be understood that the pressures required to fluidize material M and to operate non-contact valves 24 and 26, will vary, depending at least in part upon the material properties of the particular material M being processed by apparatus 10. Further, it should be particularly noted that the pressure of gas required to operate non-contact valves 24 and 26 will depend at least in part upon the density of gas-porous rings 106*a* and 106*b*, respectively.

Each of gas flow control valves 216, 218*a*–*c*, 220, 222, 224, and 226 are electrically interconnected with PLC 30 and receive therefrom, respective gas valve control signals 316, 318*a*–*c*, 320, 322, 324, and 326. Gas control valves 216, 218*a*, 218*b*, 218*c*, 220, 222, 224, and 226 control the flow of gas dependent at least in part upon gas valve control signals 316, 318*a*, 318*b*, 318*c*, 320, 322, 324, and 326, respectively.

Fill station 34 is disposed at the outlet of filling tube 86, and includes a scale 330. Scale 330 is electrically connected with and issues weight signal 334 to PLC 30. Weight signal 334 is indicative of the amount of toner within bottle 370 sitting and/or disposed on scale 330. Fill station 34 is configured to raise and lower bottle 370 into and out of association with fill tube 86, and to reduce and/or minimize the amount of material M escaping to the environment.

In use, apparatus 10 fluidizes material M throughout the bottle filling process thereby eliminating the need for augers and the problems associated therewith. Material M is moved and/or admitted into reservoir hopper 16 via rotary air lock 14. PLC 30 receives LL signal and HL signal from low and high-level sensors 46 and 48, respectively, and issues to rotary air lock 14 RALC signal 36 to control the rotational speed of rotary air lock 14 and to thereby maintain the level of material M within reservoir hopper 16 between predetermined low and high process levels.

The pressurized gas provided to reservoir hopper 16 by gas supply and control system 32 via gas inlet 44 fluidizes material M, which flows through the funnel-shaped outlet of reservoir hopper 16 and into transition and pipe assembly 18. Transition and pipe assembly 18 maintains material M in the fluidized condition or state, and modulates the pressure of the pressurized gas provided to the plurality of chambers distributed along the length thereof to thereby control the flow of material M as is more particularly described in U.S. Pat. No. 6,609,871 which, as stated above, is incorporated herein by reference. Material M must pass through non-contact valve 24 in order to enter feeder hopper 20.

The flow of material M through non-contact valve 24 is controlled by actuator 140*a* adjusting the position of plug 104*a* relative to inlet orifice 122*a* in response to and/or dependent at least in part upon actuator control signal 146*a* issued by PLC 30. More particularly, as plug 104*a* is moved upstream, i.e., against the direction of flow F of material M, nearer to and into inlet orifice 122*a* the axial positions of plug 104*a* and gas-porous ring 106*a* begin to overlap. Channel C is formed between adjacent and/or axially-overlapping portions of plug 104*a* and inlet orifice 122*a*.

The axial position of plug 104 is adjusted relative to inlet orifice 122 to thereby adjust the amount by which the two overlap and, in turn, adjust the length of channel C. As the length of channel C increases, the area of the corresponding portion of flow path 124 is reduced. Thus, the substantially constant or fixed flow of pressurized gas through gas-porous ring 106 must flow at a substantially increased rate or velocity through the restricted/reduced portion of flow path 124, i.e., the increased-length channel C. The increased velocity of the flow of gas through channel C creates a "curtain of air" effect therein that resists and/or prevents the flow of fluidized material M through channel C, dependent upon the length of channel C and the pressure at which material M is flowing. Valves 24 and 26 are in general, and plug 104, ring 106, and/or inlet orifice 122 in particular, are configured to direct the flow of pressurized air or gas in a direction that opposes the flow of material M.

Conversely, as plug 104 is moved downstream, i.e., in the direction of flow F of material M and away from inlet orifice 122, the axial overlap of plug 104 and gas-porous ring 106 is reduced and/or eliminated entirely. Thus, channel C is thereby reduced in length and/or eliminated entirely. As the length of channel C decreases, the substantially constant or fixed flow of pressurized gas into gas-porous ring 106 is less restricted and therefore flows at a reduced rate or velocity through the relatively less-restricted flow path 124, i.e., shortened-length channel C. The reduced velocity of the flow of gas through channel C reduces and/or removes the "curtain of air" effect therein and enables more fluidized material M to flow through channel C and flow path 124.

Material M flows out non-contact valve 24 and into feeder hopper 20. The pressurized gas supplied to feeder hopper 20 by gas supply and control system 32 via gas inlet 74 maintains material M in its fluidized state. Material M flows through the funnel-shaped outlet of feeder hopper 20 and into discharge hopper 22. Similarly, the pressurized gas supplied to discharge hopper 22 by gas supply and control system 32 via gas inlet 84 maintains material M in its fluidized state within discharge hopper 22. Material M must flow through non-contact valve 26 to enter filling tube 86.

Non-contact valve 26 operates in a manner that is similar to non-contact valve 24, i.e., actuator 140*b* adjusts the position of plug 104*b* in response to and/or dependent at least in part upon actuator control signal 146*b* to adjust the amount of overlap between plug 104*b* and inlet orifice 122*b* and thereby increase and/or decrease the length of channel C. Thus, the "curtain of air" effect is created and/or adjusted to thereby control the flow of fluidized material M through non-contact valve 26 and into filling tube 86 and ultimately into a toner bottle (not shown).

The flow of material M through apparatus 10 is controlled at least in part by reducing the flow of gas through gas inlets 44, 64, 74, and 84. The flow of material M is also controlled at least in part by vents 360, which are distributed throughout apparatus 10. More particularly, each of reservoir hopper 14, feeder hopper 20, and discharge hopper 22 are vented via respective vents 360, each of which are electrically connected to and receive respective vent control signals 362 from PLC 30. Each of vents 360 are opened and/or closed in response to corresponding vent control signals 362. Vents 360 are each connected to one or more recycling devices that filter particles of material M from the gas flowing therein and recycle the gas.

Toner bottle 370 is conveyed into fill station 34, and onto scale 330. Non-contact valve 26 is opened by PCL issuing an appropriate actuator control signal 146*b* to actuator 140*b*, and fluidized material M flows from discharge corresponding hopper 22 through filling tube 86 and into bottle 370. When the weight of toner bottle 370 is approaching the target, i.e., within a predetermined value of the desired weight, as indicated by scale 330 via weight signal 334, PLC 30 reduces the pressure of gas supplied by gas supply and control system 32 to one or more of reservoir hopper 16, transition and pipe assembly 18, feeder hopper 20 and/or discharge hopper 22 by issuing corresponding gas flow control signals 316, 318*a*, 318*b*, 318*c*, 320, and 322 to gas control valves 216, 218*a*, 218*b*, 218*c*, 220, and 222, respectively. Preferably, the fluidizing gas pressure within at least discharge hopper 22 is reduced. The reduced gas pressure slows the flow of material M and thereby enables more accurate filling or "topping off" of bottle 370. When the desired weight of bottle 370 is reached, as indicated at least in part by weight signal 334, non-contact valve 26 is closed by PLC 30 issuing to actuator 140*b* a corresponding actuator control signal 146*b*, and vents 360 are opened by appropriate vent control signals 362 to relieve the pressure within apparatus 10 and thereby stopping the flow of material M.

Alternatively, or additionally, PLC 30 receives LC Signal 92 from scale load cell 90, and controls the flow of material M based at least in part thereon to thereby control the filling of toner bottles.

Referring now to FIG. 2, a second embodiment of a toner feeder apparatus of the present invention is shown. Apparatus 400 includes reservoir hopper 416, transition and pipe assembly 418, non-contact valve 424, programmable logic controller (PLC) 430, and gas supply and control system 432.

Apparatus 400 is similar to apparatus 10, except that variable-orifice non-contact valve 424 has a substantially-continuously variable actuator 440, such as, for example, a linear or stepper motor. Non-contact valve 424, rather than being disposed in a feeder hopper as in apparatus 10, is configured for being disposed in and/or coupled to virtually any gas impermeable but fluidizing housing which, in turn, is coupled to other processing stations and/or equipment for processing material M. Apparatus 400 also includes load cells 490, which are associated with reservoir hopper 416, and which provide load cell signals 492 to PLC 430 to thereby enable PLC 430 to monitor the amount of toner within and/or that has flowed out of reservoir hopper 416.

Apparatus 400, rather than being a dedicated bottle filling apparatus, forms a portion of virtually any toner or fine-powder material feeding and/or conveying apparatus. By controlling the air pressure throughout apparatus 400, and particularly the air pressure supplied to reservoir hopper 416, transition and pipe assembly 418, and non-contact valve 424, the flow of material through apparatus 400 can be in virtually any direction, accurate feed rates are obtained over substantial distances, and the feed rate is controlled and varied over a wide range allowing for high bulk feed flow rates and low dribble feed flow rates. Further, by controlling the air pressure supplied to apparatus 400, the bulk density of the material is controlled thereby making operation of downstream equipment more predictable.

In the embodiment shown in FIG. 1, actuator 140*a* of variable-orifice non-contact valve 24 is configured as a three-position actuator having a first or bulk-fill position wherein plug 104*a* is substantially completely removed from inlet orifice 122*a*, a second or slow-fill position wherein a predetermined portion of plug 104*a* is disposed within inlet orifice 122, and a third stop-fill position wherein a substantial predetermined portion of plug 104*a* is disposed within inlet orifice 122. Similarly, in the embodiment shown in FIG. 1, actuator 140*b* of non-contact valve 26 is configured as a two-position actuator having a first or bulk-fill position wherein plug 104*b* is substantially completely removed from inlet orifice 122*b* and a second or stop-fill position wherein a substantial predetermined portion of plug 104*a* is disposed within inlet orifice 122. However, it is to be understood that either of actuators 140*a*, 140*b* can be alternately configured, such as, for example, as being continuously variable actuators that are capable of continuously varying the position of a respective plug relative to a corresponding inlet orifice.

In the embodiment shown in FIG. 1, the flow of material M through non-contact valves 24 and 26 is controlled by the axial position of plugs 104*a*, 104*b* relative to corresponding inlet orifices 122*a*, 122*b*. Gas supply and control system 32 supplies gas to gas-porous rings 106*a* and 106*b* of non-contact valves 24 and 26, respectively, at a predetermined and substantially constant pressure established and controlled via flow control valves 224 and 226. Thus, gas flow control valves 224 and 226 are maintained in a predetermined position, such as, for example, wide open. However, it is to be understood that the present invention can be alternately configured, such as, for example, to control the flow of material M through non-contact valves 24 and 26 by adjusting gas flow control valves 224 and 226 in response to and dependent at least in part upon corresponding gas valve control signals 324 and 326 to thereby adjust the flow of gas to gas-porous rings 106*a* and 106*b*.

In the embodiment shown, non-contact valves are configured with respective gas porous rings. However, it is to be understood that the non-contact valves of the present invention can be alternately configured with variously-shaped gas porous elements or members, such as, for example, rectangular gas-porous members and correspondingly shaped/configured plugs.

In the embodiment shown, the non-contact valves are configured with respective gas porous rings. However, it is to be understood that the non-contact valves of the present invention can be alternately configured with variously-shaped gas porous elements or members, such as, for example, rectangular gas-porous members and correspondingly shaped/configured plugs.

In the embodiment shown, the non-contact valves are configured with respective gas porous ring members and gas-impermeable plug members. However, it is to be understood that the non-contact valves of the present invention can be alternately configured, such as, for example, with a gas-impervious ring and a gas-porous plug member.

In the embodiment shown, the non-contact valves are configured with plug members that are movable with respect to a corresponding ring member. However, it is to be understood that the non-contact valves of the present invention can be alternately configured, such as, for example, with ring members that are axial movable with respect to corresponding plug members.

It is to be understood that although variable-orifice non-contact valves 24 and 26 are referred to as "non-contact" variable orifice valves, the valves may be configured and/or operated as contacting valves wherein components within the valve come into actual mechanical contact in order to control material flow. Whether the valves are operated as contact or non-contact valves is dependent upon whether the material M being controlled is susceptible to the adverse affects, such as fusing, of contacting valve or other mechanical members. Thus, the use of the term "non-contact" herein, and in relation to valves 24 and 26, is not to be construed as necessarily limiting the valves to a non-contacting method of operation. The actual mode of operation (i.e., contact or non-contact) of the valves is determined in part by the properties of material M and the use to which the valves are applied.

While this invention has been described as having preferred embodiments, the present invention can be further be modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

PARTS LIST

10 Apparatus
12 Pulverizer
14 Rotary Air Lock Valve
16 Reservoir Hopper
18 Transition and Pipe Assembly
20 Feeder Hopper
22 Discharge Hopper
24 Variable-Orifice Non-Contact Valve
26 Non-Contact Valve
30 Programmable Logic Controller
32 Gas Supply and Control System
34 Fill Station
36 RALC Signal
42 Gas-Permeable Liner
46 Low Level Sensor
48 High Level Sensor
52 Inner Conduit
64 Gas Inlets
70 Top
72 Gas-Permeable Liner
74 Gas Inlet
82 Gas-Permeable Liner
84 Gas Inlet
86 Filling Tube
90 Load Cell
92 LC Signal PARTS LIST (Continued)

102 Outer Body
104 Plug
106 Gas-Porous Ring
108 Flange
110 Front Plate Member
114 Gas Inlet

116 Sealing Member
118 Chamber
122 Inlet Orifice
124 Flow Path
126 Mounting Flanges
**140*a*** Actuator
**140*b*** Actuator
216 Gas Flow Valve
218 Gas Flow Valve
220 Gas Flow Valve
224 Gas Flow Valve
226 Gas Flow Valve
316 Gas Valve Control Signal
318 Gas Valve Control Signal
320 Gas Valve Control Signal
322 Gas Valve Control Signal
324 Gas Valve Control Signal
326 Gas Valve Control Signal
330 Scale
334 Weight Signal
336 Vents
370 Toner Bottle PARTS LIST (Continued)

400 Apparatus
416 Reservoir Hopper
418 Transition and Pipe Assembly
424 Non-Contact Valve
430 Programmable Logic Controller
432 Gas Supply and Control System
440 Actuator
490 Load Cells
HL Signal—High Level Signal
LL Signal—Low Level Signal
A—Central Axis
F—Direction of Material Flow
M—Particulate Material

What is claimed is:

1. A non-contact valve for controlling the flow of particulate material in a given direction, comprising:

a body;

a gas-porous element disposed at least partially within said body, a first orifice defined by said gas-porous element, said gas-porous elements, configured for directing a flow of pressurized gas into said first orifice, includes first and second opposing surfaces generally perpendicular to the given direction of material flow and inner and outer surfaces generally parallel with the given direction of material flow, said opposing surfaces being substantially impervious to gas, and said inner and outer surfaces being porous to gas;

a chamber defined at least in part between said body and said gas-porous element, said chamber being connected to a source of pressurized gas;

a plug member receivable within said first orifice and movable into and out of said first orifice; and a channel conjunctively defined at least in part by said first orifice and said plug, said channel defining at least in part a flow path for particulate material, and wherein said inner surface of said gas porous element defining at least in part said channel, and said outer surface of said gas porous element defining at least in part said chamber.

2. The non-contact valve of claim 1, wherein said body includes an inner flange proximate to an inlet end thereof, said first surface of said gas-porous member engaging said flange.

3. The non-contact valve of claim 2, further comprising a front plate coupled to said body and having a second orifice, said front plate attached to said body such that said second orifice is substantially coaxial relative to said first orifice, said front plate engaging said second surface of said gas-porous member, said front plate defining at least in part said chamber.

4. The non-contact valve of claim 3, further comprising a sealing member disposed between said body and said front plate.

5. The non-contact valve of claim 1, further comprising at least one gas inlet in communication with said chamber and configured for being connected to a supply of pressurized gas.

6. The non-contact valve of claim 1, further comprising an actuator configured for moving said plug member into and out of said orifice.

7. The non-contact valve of claim 6, wherein said actuator is disposed within said body.

8. The non-contact valve of claim 6, wherein said actuator is one of a stepper motor, a linear motor, an air cylinder, a hydraulic cylinder, and a solenoid.

9. The non-contact valve of claim 1, wherein said channel is defined at least in part by a clearance between axially-overlapping portions of said first orifice and said plug, said clearance being from approximately 0.005 inches to approximately 0.025 inches.

10. The non-contact valve of claim 1, wherein said gas-porous member comprises a ring of gas-porous material.

11. The non-contact valve of claim 10, wherein said ring is constructed of at least one of stainless steel, aluminum, brass and plastic.

* * * * *